United States Patent Office 3,295,972
Patented Jan. 3, 1967

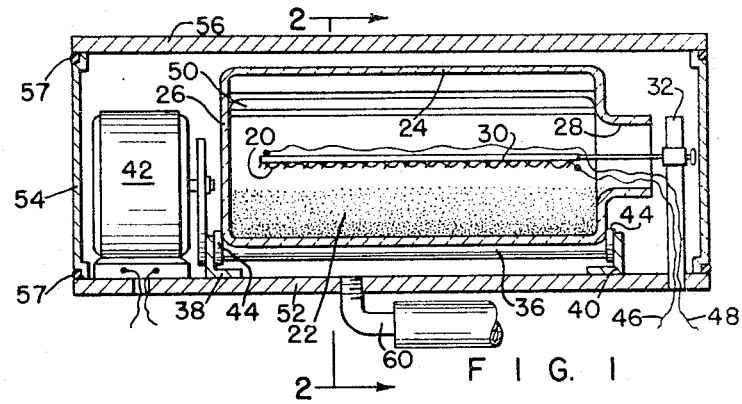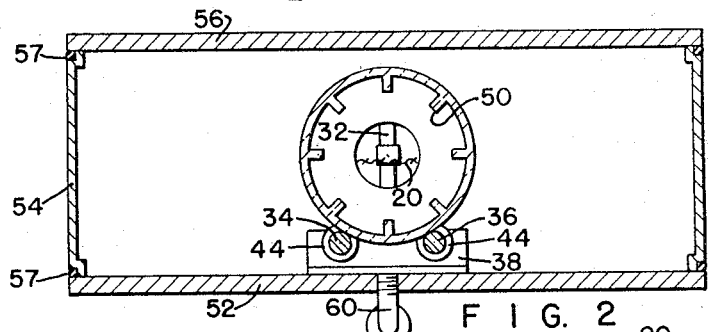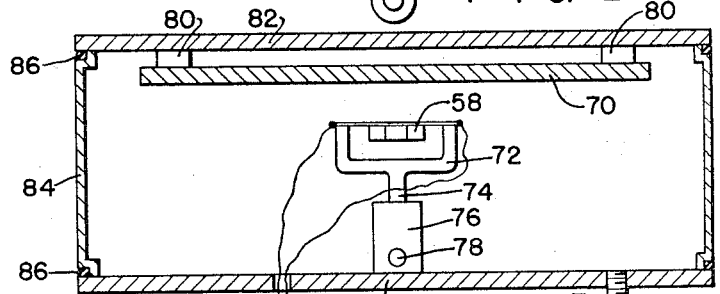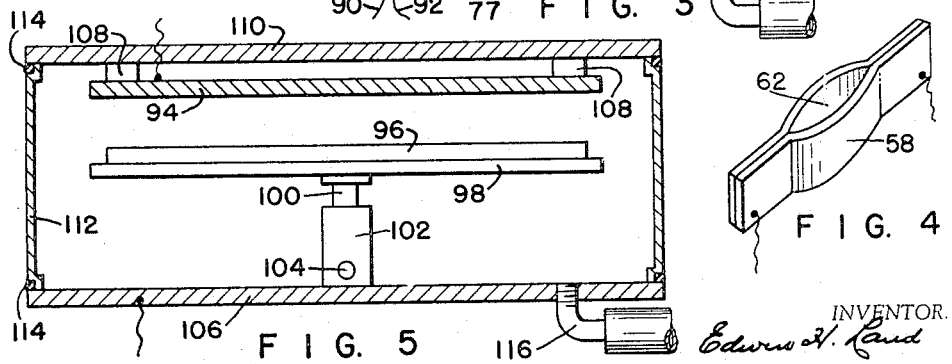

3,295,972
VAPOR DEPOSITED SILVER PRECIPITATING AGENT IN POLYMERIC RECEIVING LAYER AND PHOTOGRAPHIC USE THEREOF
Edwin H. Land, Cambridge, Mass., assignor to Polaroid Corporation, Cambridge, Mass., a corporation of Delaware
Filed Jan. 7, 1963, Ser. No. 249,922
14 Claims. (Cl. 96—29)

This application is in part a continuation of my copending application Serial No. 705,845, filed December 30, 1957 (now abandoned).

The present invention relates, in general, to methods for producing fine dispersions and, more particularly, to a novel method for producing a fine dispersion of exceptionally uniform character, useful, for example, for a variety of photographic purposes.

The primary object of the present invention is to provide a process for producing a dispersion having a finely divided internal phase distributed uniformly in an external phase incompatible therewith, the process comprising the steps of first vacuum depositing the internal phase material onto a matrix material mechanically possessing large surface area, and then blending the materials in order to disperse the internal phase material in the external phase material.

Other objects of the present invention are: to provide a novel photographic process involving subjecting an exposed silver halide stratum, in the presence of a fine dispersion prepared in the foregoing way, to a processing fluid for developing silver halide and for cooperating with the fine dispersion to form a transfer-reversal print; to provide a novel photographic process involving the use of a fine dispersion, prepared in the foregoing way, as an antioxidant; and to provide a novel photographic process involving the use of a fine dispersion, prepared in the foregoing way, as a color medium.

Other objects of the invention will in part be obvious and will in part appear hereinafter.

The invention accordingly comprises the several steps and the relation and order of one or more of such steps with respect to each of the others, and the scope of the application of which will be indicated in the claims.

For a fuller understanding of the nature and objects of the invention, reference should be had to the following detailed description taken in connection with the accompanying drawings wherein:

FIGURE 1 is a broken-away, side elevation of an apparatus for performing steps of a process of the present invention;

FIG. 2 is a cross section of the apparatus of FIGURE 1, taken substantially along the line 2—2;

FIG. 3 is a broken-away, side elevation of an apparatus for performing steps of an alternative process of the present invention;

FIG. 4 is a perspective view of a component of the apparatus of FIG. 3;

FIG. 5 is a broken-away, side elevation of an apparatus for performing steps of another alternative process of the present invention;

Figure 6:
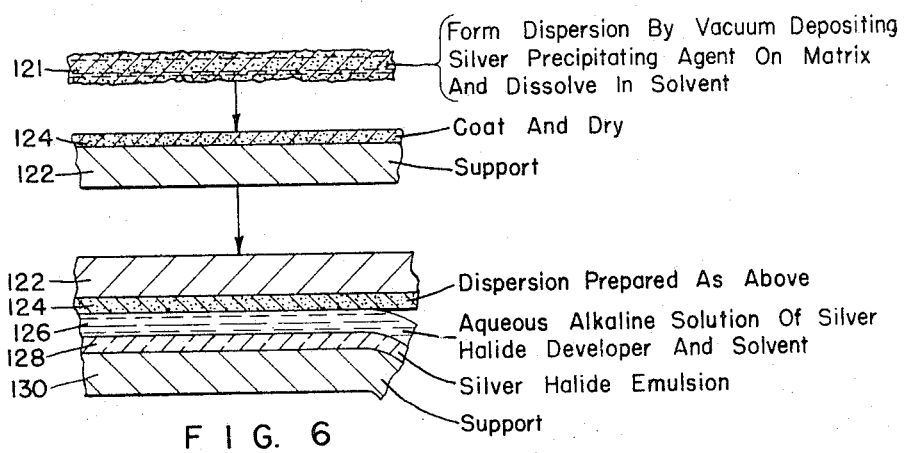
FIG. 6 is a flow diagram showing exaggerated cross-sectional views of materials undergoing steps of a photographic process of the present invention.

Generally, as indicated above, the processes of the present invention herein disclosed involve vacuum depositing at least part of the material that is to constitute the internal phase onto a matrix material mechanically possessing large surface area, and then blending the materials in order to disperse or to prepare to disperse the internal phase material in at least part of the material that is to constitute the external phase. The step of vacuum depositing involves either evaporating or sputtering at pressures below 100 microns of mercury and usually within the range of from 0.1 to 100 microns of mercury, these pressures being produced by continuous evacuation to ensure the rapid removal of any gases produced during the vacuum deposition process. The internal phase material is transmitted to the matrix material in submicroscopic, e.g. molecular or atomic, form. The matrix material, which may constitute at least a proportion of the external phase, initially is in powder-like or sheet-like form for the purpose of providing large surface area per mass. Where the matrix material is to constitute the external phase exclusively, the ultimate dispersion may be produced from the coated matrix material by blending, for example, by molding under heat or casting, spraying or flowing from solution. Where the matrix material is not to constitute the external phase exclusively, the matrix material, after being coated, may be blended in any suitable way with the remaining materials of the external phase, for example, may be dissolved in a solution already containing these remaining materials. The present invention provides a flexible technique for providing dispersions in which the internal phase, the external phase or both comprise a plurality of different materials. Thus, one or more internal phase materials may be vacuum deposited on one or more matrix materials and the resulting materials blended with one or more additional materials to provide a dispersion of desired formulation.

FIGURE 1 illustrates an apparatus for evaporating an internal phase material 20 onto a matrix material 22 of large surface area per mass. Material 20, for example, is a metal in the form of a coating upon a wire gauze and material 22, for example, is in the form of a finely divided powder composed of an organic plastic. Powder 22 is contained within a cylindrical glass jar 24, one end of which is closed at 26 and the other end of which is provided with an open mouth 28. Gauze 20 is supported by a mounting arm 30 extending through mouth 28 and carried by a standard 32. Jar 24 rests upon a pair of rollers 34 and 36, the ends of which are journaled in bearing mounts 38 and 40. A motor 42 is provided for rotating rollers 34 and 36 through gearing 37 in order to cause rotation of jar 24, which is prevented from moving longitudinally by circular flanges 44 at the ends of the rollers. As shown, electrical leads 46 and 48 are connected to the opposite extremities of gauze 20 in order to transmit a suitable electric current through the gauze from a power supply (not shown). In operation, a sufficient current is transmitted by leads 46 and 48 through gauze 20 for generating sufficient heat to cause rapid evaporation of the coating of gauze 20. At the same time, motor 42 causes rotation of rollers 34 and 36 so that powder 22 is continuously agitated by movement of the inner surfaces of jar 24 as well as a plurality of ribs 50 projecting inwardly from the inner surfaces of the jar. The apparatus, including jar 24, is mounted on a base plate 52 and enclosed by such means as a glass cylinder 54 and a cover plate 56. O-ring gaskets 57 hermetically seal glass cylinder 54 between base plate 52 and cover plate 56. A pump (not shown) continuously exhausts the region defined by base plate 52, glass cylinder 54 and cover plate 56 through a conduit 60. Powder 22, as a result, becomes coated with the metal which initially is part of gauze 20. The coated powder then is heated and molded or dissolved and cast to form a two-phase solid comprising the metal of gauze 20 as an internal phase and the plastic of powder 22 as an external phase.

An alternative method for producing a dispersion in accordance with the present invention is shown in FIGS. 3 and 4 as involving the volatilization of a quantity of an internal phase material 62, for example, a metal within an electrically heated crucible 58, typically composed of tantalum, above which is located an extremely thin sheet of a matrix material 70 in the form of an organic plastic. As shown, crucible 58 is carried by a mount 72 having a depending shaft 74, which is adjustably secured in an upstanding sleeve 76 by a manually controlled screw 78. Sleeve 76 is carried by a base plate 77. Sheet 70 is carried by a pair of supports 80, in turn mounted under a cover plate 82. The region defined by the base plate 77 and cover plate 82 is enclosed by a glass cylinder 84, which is hermetically sealed between the base plate and the cover plate by a pair of upper and lower O-rings 86. In operation, the region defined by base plate 77, glass cylinder 84 and cover plate 82 is continuously exhausted by a pump (not shown) through a conduit 88 and crucible 58 is heated by a relatively large current supplied through a pair of leads 90 and 92. The coated sheet 70 then is heated and molded or dissolved and cast to form a two-phase solid comprising metal 62 as an internal phase and the plastic of sheet 70 as an external phase.

Another alternative method for producing a dispersion in accordance with the present invention is shown in FIG. 5 as involving so-called "cathode sputtering." When an electrical discharge is passed between electrodes under low gas pressure, the cathode electrode is slowly disintegrated under bombardment by ionized gas molecules. The disintegrated material leaves the cathode surface either as free atoms or in chemical combination with the residual gas molecules. Some of the liberated atoms are condensed on surfaces surrounding the cathode.

As shown in FIG. 5, in accordance with the present invention, a material, for example, a metal to form the internal phase is sputtered from a cathode 94 onto a sheet 96 of a matrix material, for example, an organic plastic that is to form the external phase. Sheet 96 is carried by a mount 98 having a depending shaft 100, which is adjustably secured within an upstanding sleeve 102 by a manually controlled screw 104. Upstanding sleeve 102 is supported upon a base plate 106. Cathode 94 is carried under a cover plate 110 by a pair of insulating spacers 108. The region defined by base plate 106 and cover plate 110 is enclosed by a metallic cylinder 112, which is hermetically sealed between the base plate and the cover plate by a pair of upper and lower O-rings 114. In operation, the region defined by base plate 106, cylinder 112 and cover plate 110 is continuously exhausted by a pump (not shown) through a conduit 116. A voltage capable of producing sputtering within an atmosphere at the pressure determined by the pump is applied between cylinder 112 and cathode 94 which, when so excited, transmits atomic or molecular particles to sheet 96. The coated sheet 96 then is heated and molded or dissolved and cast to form a two-phase solid comprising the metal from cathode 94 as an internal phase and the plastic of sheet 96 as an external phase.

As indicated above, although the process of the present invention has general utility, it is specifically applicable to certain products that are particularly useful in photographic transfer reversal processes. In a silver-transfer reversal process, for example, a photoexposed silver halide material and a silver precipitating material are subjected to an aqueous alkaline solution of a silver halide developer and a silver halide solvent. The developer reduces exposed silver halide to silver and the solvent reacts with unreduced silver halide to form a complex silver salt that migrates to the silver precipitating material where it is reduced to form a visible silver print. It has been found that the silver precipitating material is particularly effective for this purpose when dispersed in accordance with the present invention. When, for example, the silver-transfer reversal process involves spreading a processing fluid between the superposed surfaces of a photoexposed, photosensitive silver halide stratum and another stratum, the silver precipitating material may be dispersed in either of the strata or in the fluid by vacuum depositing upon a matrix material and blending as above.

Here, specific materials of which the internal phase may be composed include heavy metals such as iron, lead, zinc, nickel, cadmium, tin, chromium, copper, cobalt, particularly noble metals such as gold, silver, platinum and palladium. Alternatively these specific materials include sulfides and selenides of heavy metals, particularly: sulfides of mercury, copper, aluminum, zinc, cadmium, cobalt, nickel, lead, antimony, bismuth, cerium and magnesium; and selenides of lead, zinc, antimony and nickel. The function of such materials as silver precipitating agents in a transfer reversal product is described in U.S. Patent No. 2,774,667, issued on December 18, 1956 in the names of Edwin H. Land et al. Plastic materials of which the external phase may be composed advantageously are cellulosics such as carboxymethyl cellulose and cellulose acetate hydrogen phthalate, vinyls such as polyvinyl alcohols, nylons such as polyhexamethylene adipamide, and natural polymers such as agar, casein, gelatin, etc. When the vacuum deposition is effected by evaporation, temperatures ranging from 300 to 1500° C., in accordance with the requirements of the material being evaporated, and pressures below 0.5 micron of mercury are common. When the vacuum deposition is effected by cathode sputtering, voltages of the order of 5 to 10 kilovolts, and pressures of from 10 to 20 microns of mercury are common.

FIG. 6 illustrates the preparation of a silver-transfer reversal print-receptive sheet and its use in accordance with the present invention. First, a dispersion of silver precipitating nuclei 121 is formed by vacuum depositing a silver precipitating material upon a matrix of large surface area per mass and the resulting product is at least partially dissolved in a solvent such as water. Then the resulting fluid is cast onto a support 122 and dried to form a silver-receptive stratum 124. Finally, a silver print is formed in stratum 124 when a silver halide processing fluid 126 is spread in a uniformly thin layer between adjacent superposed surfaces of silver-receptive stratum 124 and a photoexposed photosensitive silver halide emulsion 128 that is coated upon a support 130. Processing fluid 126 contains an alkaline aqueous solution of a silver halide developer and a silver halide solvent. The spreading, for example, may be accomplished by advancing the sheets, together with the fluid, between a pair of pressure-applying rollers. Further details of processes of this type are disclosed in U.S. Patent No. 2,543,181, issued to Edwin H. Land on February 27, 1951.

Figure 7:
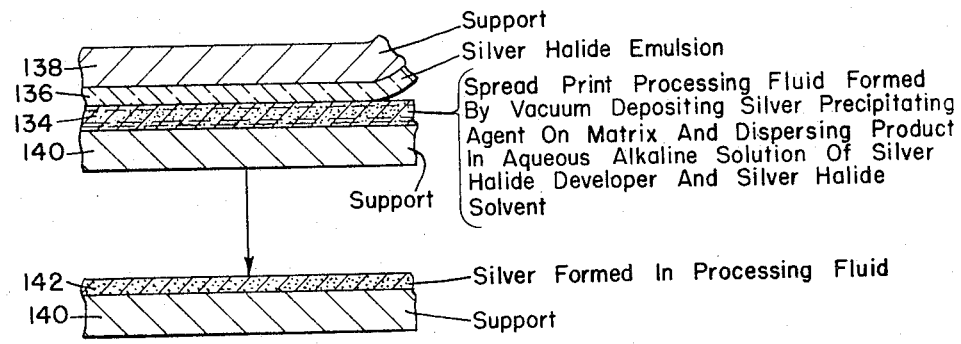
FIG. 7 is a flow diagram showing exaggerated cross-sectional views of materials undergoing steps of an alternative photographic process of the present invention.

The materials of FIG. 7 are similar to those of FIG. 6, except that the finely dispersed silver precipitating agent, in proximity with which the positive print forms, is distributed in a processing fluid 134 rather than in a silver precipitating stratum corresponding to silver precipitating stratum 124 of FIG. 6. As shown, processing fluid 134 is formed by vacuum depositing a silver precipitating agent on a matrix and dispersing the product in an aqueous alkaline solution of a silver halide developer and a silver halide solvent. Processing fluid 134 then is spread between support 140 and a photoexposed photosensitive silver halide stratum 136 that is coated upon a support 138. Here, while the positive print is being formed in processing fluid 134, the processing fluid hardens into a continuous film 142 which may be stripped with support 140 from photosensitive stratum 136 after it has received a silver print by transfer reversal from photosensitive stratum 136. Further details of processes of this type are disclosed in U.S. Patent No. 2,662,822, issued in the name of Edwin H. Land on December 15, 1953.

In one form, photosensitive strata 128 and 136 contain one or more of the silver halides, of which silver chloride, silver bromide and silver iodide are examples, dispersed in a suitable protective colloid material, for example, gelatin, agar, albumen, casein, collodion, a cellulosic such as carboxymethyl cellulose, a vinyl polymer such as polyvinyl alcohol or a linear polyamide such as polyhexamethylene adipamide. Examples of specific formulations of conventional emulsions suitable for such use are described in T. T. Baker, Photographic Emulsion Technique, American Photographic Publishing Company, Boston, 1948, Chapter IV.

Dispersions 121 of FIG. 6 and 134 of FIG. 7 contain a silver halide developer and a silver halide solvent. Suitable developers for these dispersions are: benzene derivatives having at least two hydroxyl and/or amino groups substituted in ortho or para position on the benzene nucleus, such as hydroquinone, amidol, metol, glycin, p-aminophenol and pyrogallol; and hydroxylamines, in particular, primary and secondary aliphatic and aromatic N-substituted or β-hydroxylamines which are soluble in aqueous alkali, including hydroxylamine, N-methyl hydroxylamine, N-ethyl hydroxylamine, and others described in U.S. application Serial No. 470,802, filed November 23, 1954 (now U.S. Patent No. 2,857,276, issued October 21, 1958) in the name of Edwin H. Land et al. Suitable silver halide solvents for these dispersions are: conventional fixing agents such as sodium thiosulfate, sodium thiocyanate, ammonium thiosulfate and others described in the aforementioned U.S. Patent No. 2,543,181; and associations of cyclic imides and nitrogenous bases such as associations of barbiturates or uracils, and ammonia or amines, and other associations described in U.S. application Serial No. 378,684, filed September 4, 1953 (now U.S. Patent No. 2,857,274, issued October 21, 1958) in the name of Edwin H. Land et al.

*Example I*

In a specific example of the process of FIG. 6, dispersion 121 is formed by evaporating 10 parts of gold onto 400 parts of 20 mesh carboxymethyl cellulose powder. Five parts of the resulting product are dissolved in 100 parts of water. Then the resulting dispersion is cast on support 122 and dried to form layer 124, which preferably is from 1 to 8 microns thick. Silver halide emulsion 128 is a moderately high speed gelatino iodobromide emulsion .0001 to .0009 inch thick, of the type sold by Eastman Kodak under the trade name Verichrome. Processing fluid 126 has the following formulation:

| | Parts |
|---|---|
| Water | 1860 |
| Sodium carboxymethyl cellulose | 93 |
| Sodium sulfite | 78 |
| Sodium hydroxide | 54.6 |
| Sodium thiosulfate | 14.5 |
| Hydroquinone | 52 |

In preparing this processing fluid, the sodium carboxymethyl cellulose is dissolved first in water at room temperature. Thereafter, the sodium sulfite, sodium hydroxide and sodium thiosulfate are added to the solution, the addition being effected in an inert atmosphere of nitrogen. The hydroquinone then is added and the composition is mixed for an hour at approximately room temperature in a nitrogen atmosphere. After processing fluid 126 is spread, silver halide stratum 128 and silver-receptive stratum 124 are maintained in superposed relation with the processing fluid therebetween for a period of from 40 to 120 seconds in duration. At the end of this period, silver-receptive stratum 124 and its support are stripped from processing composition 126, together with silver halide emulsion 128 and its support 130, to display a positive print of high quality.

*Example II*

In a specific example of the process of FIG. 7, silver halide emulsion 136 is the same as silver halide emulsion 128 above, and a discrete silver precipitating stratum corresponding to that designated 124 in FIG. 6 is omitted. Here, processing fluid 134 has the following formulation:

| | Parts |
|---|---|
| Water | 1860 |
| Sodium carboxymethyl cellulose | 119 |
| Dispersed gold | 3 |
| Sodium sulfite | 78 |
| Sodium hydroxide | 74.6 |
| Sodium thiosulfate | 14.5 |
| Hydroquinone | 52 |

In preparing this processing fluid, first, ten parts of gold are evaporated onto 400 parts of 20 mesh carboxymethyl cellulose powder. Next, 121 parts of the resulting product are dissolved in 1860 parts of water. Thereafter, the sodium sulfite, sodium hydroxide and sodium thiosulfate are added to the solution, the addition being effected in an inert atmosphere of nitrogen. The hydroquinone is added and the composition is mixed for an hour at approximately room temperature in a nitrogen atmosphere. In operation, processing fluid 134 is spread in a layer, from two to six thousandths of an inch thick, between photosensitive stratum 136 and support 140, which thereafter are maintained in superposed relation for a period of time ranging from 40 to 120 seconds in duration. At the end of this period, support 140 and stratum 142, which has been formed from fluid 134 and is now from 1 to 15 microns thick, are stripped together from photosensitive stratum 136 to display a positive print of high quality.

Figure 8:
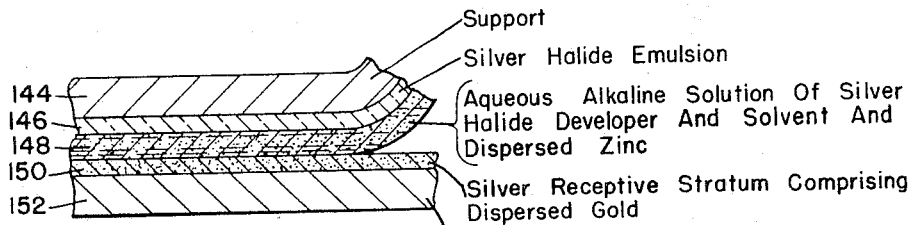
FIG. 8 shows an exaggerated cross-sectional view of materials for performing steps of another alternative photographic process of the present invention.

In silver-transfer reversal processes of the type specifically described in Examples I and II, the processing composition contains sodium sulfite, which functions as an antioxidant to maintain the developer in the reduced state. This sodium sulfite, however, undesirably tends to harden the gelatin with which it comes in contact. It has been found that such sodium sulfite may be replaced by zinc, dispersed in accordance with the present invention, which has no hardening effect on gelatin but which serves as an effective antioxidant. FIG. 8 shows an assemblage comprising, in sequence, a support 144, a silver halide emulsion 146, a silver-receptive stratum 150 and a support 152, identical to support 130, silver halide emulsion 128, silver-receptive stratum 124 and support 122 of FIG. 6, respectively. In processing composition 148 of FIG. 8, however, the antioxidant is dispersed zinc.

*Example III*

Here, processing composition 148 has the following formulation:

| | Parts |
|---|---|
| Water | 1860 |
| Sodium carboxymethyl cellulose | 119 |
| Dispersed zinc | 3 |
| Sodium thiosulfate | 14.5 |
| Diethylamine | 100 |

In preparing this formulation, a dispersion of zinc in aqueous carboxymethyl cellulose is prepared by evaporating 10 parts of zinc onto 400 parts of 20 mesh carboxymethyl cellulose powder. Next, 121 parts of the resulting product is dissolved in 1860 parts of water. Then the sodium thiosulfate and diethylamine are added, care being effected to prevent evaporation of the diethylamine. The dispersed zinc serves effectively as an antioxidant while the processing formulation is stored, and does not interfere with the silver-transfer reversal process effected by the composition when used.

In specific Examples I, II and III, the proportions of the ingredients in the processing fluids may be varied within wide limits. However, where the processing period is, as specified, within the range of from 40 to 120 seconds, in accordance with the now conventional duration of silver-transfer reversal processing periods, practical results are achieved where, in concentration by total weight of the fluid, the developer ranges from 1 to 8% and the silver halide solvent from .3 to 10%.

The process of the present invention also is particularly applicable to the production of the diffusion-transfer reversal assemblage capable of producing a multicolor print. One such assemblage employs so-called dye developers which become immobilized when reacted with exposed silver halide of a photosensitive emulsion, but which remain mobile when not so reacted. Such an assemblage may comprise discrete strata in which a cyan dye developer is associated with a red-sensitive emulsion, a magenta dye developer is associated with a green-sensitive emulsion and a yellow dye developer is associated with a blue-sensitive emulsion. After the foregoing strata are photoexposed, a layer of alkaline aqueous solution may be spread between the assemblage and an auxiliary print-receiving stratum. The various dye developers react with exposed portions of the silver halide emulsions with which they are associated. Portions of the dye developers so reacted are immobilized and portions of the dye developers remaining unreacted migrate through the various layers of the assemblage and the layer of alkaline aqueous solution to the print-receiving stratum where they form a multicolored print. In accordance with the present invention, the dye developers may be dispersed in their respective strata by evaporation, deposition and blending. In exposing an assemblage of the foregoing type, the outermost dye developer strata may be required to possess greater light transmission than the innermost dye developer stratum in order to permit the innermost stratum to be properly exposed. Toward this end the present invention enables the dye developers in the outer strata to be dispersed as small particles which do not impart as great a covering power as they would if dispersed in solid solution.

Figure 9:
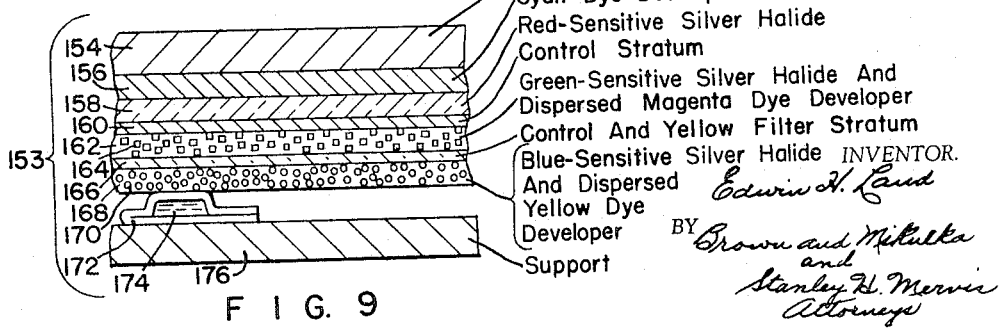
FIG. 9 shows an exaggerated cross-sectional view of materials for performing steps of another alternative photographic process of the present invention.

FIG. 9 illustrates at 153 such an assemblage comprising, in sequence, a support 154, a cyan dye developer stratum 156, a red-sensitive silver halide emulsion stratum 158, a spacer stratum 160, a green-sensitive stratum 162 containing discrete particles 164 of a magenta dye developer, a spacer and yellow filter stratum 166 and a blue-sensitive silver halide emulsion stratum 168 having dispersed therein discrete particles 170 of a yellow dye developer. A rupturable container 172 carries a processing composition 174 in the form of an aqueous alkaline solution to be spread in a thin layer between stratum 168 and a print-receiving stratum 176. The purpose of distributing magenta dye developer 164 and yellow dye developer 170 in particulate form is to render them available to perform their functions as described below, while at the same time to reduce their covering power in order to permit the transmission of light to photosensitive materials closer to support 154. Thus, for example, innermost photosensitive stratum 158, which need not transmit light to a layer closer to support 154, need not be so distributed and is shown as being dispersed in solid solution. Excellent dispersions of the type shown at 164 and 170 may be produced, in accordance with the present invention, by vacuum depositing the dye developer upon a matrix of the type described above, of large surface area per mass and blending. Yellow filter stratum 166 is provided for attenuating light of wave-lengths that must be prevented from affecting strata 162 and 158. In practice, when aqueous alkaline solution 174 is supplied in a thin layer between stratum 168 and print-receiving stratum 176, permeates all the layers of assemblage 153. The process is such that red-sensitive emulsion 158, green-sensitive emulsion 162 and blue-sensitive emulsion 168 are differentially developed by cyan dye developer 156, magenta dye developer 164 and yellow dye developer 170, respectively, which in consequence, become immobilized, more specifically insolubilized. On the other hand, the unexhausted or unreacted cyan dye developer 156, magenta dye developer 164 and yellow dye developer 170 are free to migrate in the solution to print-receiving stratum 176 where they form a multicolored print. Spacer layers 160 and 166, which, for example, are composed of gelatin, operate to confine the developing action of the dye developers to the respective emulsion layers with which they are originally associated.

As examples of suitable dye developers for the foregoing purposes, mention may be made of 1-phenyl-3-N-n-hexylcarboxamido - 4 - [p-(2',5'-dihydroxyphenethyl)-phenylazo] - 5 - pyrazolone, for yellow; 2-[p-(2',5'-dihydroxyphenethyl) - phenylazo]-4-methoxy-1-naphthol, for magenta; 1,4 - bis - [β-(2',5' - dihydroxyphenyl)-propylamino]-anthraquinone, for cyan.

Other dyes of various types may be dispersed advantageously in accordance with the present invention. Thus, refractory dyes, for example, quininoid vat dyes such as indigo, thioindigo, 6,6'-dibromoindigo and indanthrone, phthalocyanines such as phthalocyanine, copper phthalocyanine or lead phthalocyanine, and benzanthrone dyes such as anthraquinolinequinone, 1-benzoyl naphthalene and benzanthrone, may be evaporated onto a matrix, for example, a high polymer such as polyvinyl alcohol, polycarboxymethyl cellulose or polyhexamethylene adipamide, in powder or sheet form, and the resulting product may be blended to produce a colored solid useful, for example, in the manufacture of plastic products of various types including fibres, sheets and the like.

It is to be understood expressly that the matrix on which the material of the internal phase initially is deposited need not become a component of the ultimate external phase. Thus, for example: first, the internal phase material, e.g., a metal, may be deposited upon a disposable matrix, e.g., sodium chloride, to provide a coated powder; then the coated powder may be dispersed in the external phase material, e.g., cellulose acetate hydrogen phthalate in an aqueous alkaline solution including a volatile base such as diethyl hydroxylamine; and finally, after the resulting dispersion is dried, the disposable matrix may be dissolved from the resulting dispersion by washing, e.g., with water, in which cellulose acetate hydrogen phthalate is insoluble.

The herein disclosed embodiments of the present invention thus provide a variety of techniques for controlling the dispersion of print-forming materials in a wide variety of diffusion-transfer reversal processes.

It has been noted above that a dispersion of zinc may be effectively employed as an antioxidant in a photographic processing composition. The antioxidant properties of such a dispersion of zinc also may be effectively utilized in photographic sheet components, e.g., as a layer in an image-receiving element, said zinc dispersion being adjacent, i.e., in antioxidant relationship, to an imagewise distribution of image-forming components, e.g., dye developers, which image-forming components are susceptible to oxidation.

It is recognized that colloidal dispersions of silver precipitating agents, e.g., silver or gold, previously have been proposed for use in diffusion transfer processes. Such colloidal dispersions usually are formed by chemical reduction of suitable soluble salts of the metal. While such colloidal dispersions are useful in silver transfer processes, it is extremely difficult to accurately and reproducibly control the size distribution of the dispersion particles. In addition, the method of preparation inherently presents a problem of removing the anions of the metallic salt and other by-products which may be undesirable or detrimental in the ultimate photographic utilization. The procedures disclosed herein for preparing dispersions permit more accurate control of particle size and avoid the introduction of possible contaminants. In addition, it has been found that the use of the herein disclosed dispersions in silver transfer processes unexpectedly provides silver transfer images having more neutral and more even tones than are obtained by use of previously proposed silver precipitating agents in the absence of special toning agents. Thus, use of the dispersion of gold as in Example I gives silver transfer images of unusually neutral tones, and the tone varies very little with variations in density, i.e., the various steps in a step tablet transfer image exhibited substantially even neutral tones, notwithstanding differences in density.

Since certain changes may be made in the above products, processes and compositions without departing from the scope of the invention herein involved, it is intended that all matter contained in the above description or shown in the accompanying drawings shall be interpreted as illustrative and not in a limiting sense.

What is claimed is:

1. The process of forming images by diffusion-transfer which comprises developing a latent image in an exposed silver halide layer, forming a transferable silver complex part at least of the unreduced silver halide of said layer, transferring at least part of said complex to a print-receiving layer comprising a stratum from 1 to 8 microns thick of a silver precipitating agent dispersed in an organic plastic material, and forming an image comprising silver on said stratum by means of the silver transferred to said stratum, said stratum of silver precipitating agent being formed by vacuum depositing a normally solid silver preciptating agent upon said organic plastic material in a form presenting a large surface area, said silver precipitating agent containing at least a metallic component, mixing the resultant product with a liquid which is a solvent for said organic plastic material and a nonsolvent for said vacuum deposited silver precipitating agent, thereby dissolving said organic plastic material and forming a fine dispersion comprising said vacuum deposited silver precipitating agent as the discontinuous phase and said organic plastic material as at least part of the continuous phase of said dispersion.

2. The process as defined in claim 1, wherein said silver precipitating agent is gold and said organic plastic material is sodium carboxymethyl cellulose.

3. The process as defined in claim 1, wherein said dispersion is coated upon a support to provide said print-receiving layer.

4. The process as defined in claim 1, wherein said dispersion is contained in a processing fluid applied to said silver halide to effect said development.

5. The process of forming images by diffusion-transfer which comprises spreading a processing composition between the closely adjacent surfaces of a pair of superposed sheets, one sheet of said pair having a photoexposed photosensitive silver halide layer, said composition containing an aqueous alkaline solution including a silver halide developing agent, a silver halide solvent, a silver precipitating agent and an organic plastic material, said composition being formed by vacuum depositing a silver precipitating agent upon an organic plastic material presenting large surface area then further mixing said vacuum deposited silver precipitating agent and said organic plastic material with a liquid which is a solvent for said organic plastic material and a nonsolvent for said silver precipitating agent, thereby dissolving said organic plastic material and forming a fine dispersion comprising said vacuum deposited silver precipitating agent as the discontinuous phase and said organic plastic material as at least part of the continuous phase, and mixing said fine dispersion with a silver halide developing agent and a silver halide solvent, developing the latent image in said silver halide layer, forming a transferable silver complex with part at least of the unreduced silver halide in said silver halide layer, and converting said silver complex to silver between said sheets to form a visible image in a stratum of said organic plastic material.

6. The process as defined in claim 1, wherein said organic plastic material is in the form of a powder.

7. The process as defined in claim 1, wherein said silver precipitating agent comprises a noble metal.

8. The process as defined in claim 1, wherein said silver precipitating agent comprises a heavy metal.

9. The process as defined in claim 1, wherein said vacuum depositing includes the step of sputtering said coating material.

10. An image-receiving element for use in silver diffusion-transfer processes, said image-receiving element comprising a support and a silver-receptive stratum carried by said support, said silver-receptive stratum being from 1 to 8 microns thick and comprising an organic plastic material having dispersed therein a silver precipitating agent containing at least a metallic component, said silver receptive stratum having been formed by vacuum depositing a normally solid silver precipitating agent upon said organic plastic material in a form presenting a large surface area, mixing the resultant product with a liquid which is a solvent for said organic plastic material and a nonsolvent for said vacuum deposited silver precipitating agent, thereby dissolving said organic plastic material and forming a fine dispersion comprising said vacuum deposited silver precipitating agent as the discontinuous phase and said organic plastic material as at least part of the continuous phase of said dispersion, and coating said dispersion in a thin stratum on said support.

11. An image-receiving element as defined in claim 10, wherein said silver precipitating agent is gold and said organic plastic material is sodium carboxymethyl cellulose.

12. The process as defined in claim 7 wherein said silver precepitating agent is gold.

13. The process as defined in claim 1 wherein said silver precipitating agent is a metallic sulfide.

14. The process as defined in claim 1 wherein said silver precipitating agent is a metallic selenide.

References Cited by the Examiner

UNITED STATES PATENTS

| | | | |
|---|---|---|---|
| Re. 25,454 | 10/1963 | Novak | 117—100 |
| 2,686,716 | 8/1954 | Land | 96—29 |
| 2,274,667 | 12/1956 | Land et al. | 96—29 |
| 2,825,687 | 3/1958 | Preston et al. | 204—192 |
| 2,839,378 | 6/1958 | McAdow | 106—290 |
| 2,947,646 | 8/1960 | Devaney et al. | 106—93 |

NORMAN G. TORCHIN, *Primary Examiner.*

D. LEVY, *Assistant Examiner.*

UNITED STATES PATENT OFFICE
CERTIFICATE OF CORRECTION

Patent No. 3,295,972                          January 3, 1967

Edwin H. Land

It is hereby certified that error appears in the above numbered patent requiring correction and that the said Letters Patent should read as corrected below.

Column 7, line 73, for "permeates" read -- it permeates --; column 8, line 14, for "purposes" read -- purpose --; column 9, lines 22 and 23, for "complex part" read -- complex with part --; line 50, after "halide" insert -- layer --.

Signed and sealed this 6th day of August 1968.

(SEAL)
Attest:

Edward M. Fletcher, Jr.                          EDWARD J. BRENNER
Attesting Officer                                   Commissioner of Patents